United States Patent
Boehme et al.

[11] Patent Number: 5,901,314
[45] Date of Patent: May 4, 1999

[54] METHOD FOR REDUCING THE SIZE OF COMPUTER PROGRAMS

[75] Inventors: Thomas Boehme, Porirua, New Zealand; Juergen Uhl, Boeblingen, Germany

[73] Assignee: International Business Machines Corporation, Armonk, N.Y.

[21] Appl. No.: 08/697,972

[22] Filed: Sep. 3, 1996

[30] Foreign Application Priority Data

Sep. 25, 1995 [DE] Germany ............................ 196 35 519

[51] Int. Cl.$^6$ ....................................................... G06F 9/44
[52] U.S. Cl. ........................ 395/701; 395/710; 395/683; 395/685; 707/103; 707/100
[58] Field of Search ..................................... 395/683, 685, 395/701, 702, 703, 707, 709, 682; 707/100–104; 345/433

[56] References Cited

U.S. PATENT DOCUMENTS

| | | | |
|---|---|---|---|
| 5,093,914 | 3/1992 | Coplien et al. | 395/704 |
| 5,327,562 | 7/1994 | Adcock | 395/308 |
| 5,339,438 | 8/1994 | Conner et al. | 395/705 |
| 5,371,891 | 12/1994 | Gray et al. | 395/705 |
| 5,481,708 | 1/1996 | Kukol | 395/708 |
| 5,560,005 | 9/1996 | Hoover et al. | 707/10 |
| 5,710,894 | 1/1998 | Maulsby et al. | 395/326 |
| 5,740,443 | 4/1998 | Carini | 395/705 |

*Primary Examiner*—Tariq R. Hafiz
*Assistant Examiner*—Tuan Q. Dam
*Attorney, Agent, or Firm*—William A. Kinnaman, Jr.

[57] ABSTRACT

A method of reducing the size of compiled and executable computer programs which are edited with the aid of object-oriented programming techniques. The common portions of a program produced by an object-oriented programming technique are separated as untyped implementation classes from the typed interface classes with parameterized templates where the typed interface classes comprise no virtual functions. Untyped implementation classes are arranged in a second polymorph class hierarchy, and method calls to the interface classes are delegated to the implementation classes. The invention is particularly applicable to the technical field of producing class libraries for an object-oriented programming language. The invention advantageously achieves an effective and significant reduction in the size of computer programs and thus allows the computer program to be stored and executed with less demand on the hardware requirements of the computer system.

14 Claims, 4 Drawing Sheets

METHOD FOR REDUCING THE SIZE OF COMPUTER PROGRAMS

BACKGROUND OF THE INVENTION

1. Field of the Invention

This invention relates to a method for reducing the size of computer programs, in particular, to a method of reducing the size of compiled and executable computer programs which are edited with the aid of object-oriented programming techniques. The invention is particularly applicable to the technical field of producing class libraries for an object-oriented programming language.

2. Description of the Related Art

Because of their specific advantages, object-oriented programming techniques are well entrenched in the development of computer programs. In particular, the reusability of source code with which the object-oriented programming techniques are produced is a decisive factor in the use of these programming techniques.

In object-oriented programming the source code is structured not according to function but according to data; for this, special data structures are employed, the so-called objects A typical representative of the object-oriented programming languages is the programming language known as C++. Here the objects can be taken from so-called classes or, expressed in technical language, instantiated The objects receive certain functionalities from the classes from which they are instantiated and are specified by means of additional data fields through the process of instantiating.

An introduction to the technology of object-oriented programming techniques and to an explanation of the relevant terminology is provided in G Booch, *Object-Oriented Analysis and Design with Applications*, Benjamin/Cummings Publishing, 2nd Edition, 1994.

C++ is presented and described, for example, in A. Koenig, *Programming Language C++*, ANSI Committee, WG21/No545, 1994 and in B. Stroustrup, *The C++ Programming Language*, 2nd Edition, AT&T Bell Telephone Laboratories, 1991.

The object-oriented programming technique frequently requires structuring of the classes with hierarchical links. This leads to the design of a class hierarchy The individual classes of the class hierarchy can exhibit so-called virtual functions which can be passed to all derived classes and the functional range of which can be more closely defined by an implementation in the derived classes. When a class exhibits at least one such virtual function, one talks of an abstract class or rather of an abstract class hierarchy This abstraction on the basis of virtual functions allows the polymorph use of the hierarchically linked classes, that is, through the abstract view of an object it is possible to describe any desired object of any desired derived class.

In addition to the class hierarchy, a parameterizing of the class hierarchy by means of one or more data types is often required to enable a rigidly typed and at the same time flexible instance of the class hierarchy. For example element types such as STRING or INTEGER are transferred as arguments for the formal parameters of a parameterized class or a parameterized class hierarchy For this purpose generic types, so-called templates, are used. In C++, the above-mentioned instances are realized through this template mechanism.

The use of the virtual functions with their associated polymorph form of the classes and the use of parameterized template classes leads to a marked increase in the size of the executable computer program in accordance with the abbreviated formula:

Program size = Number of virtual functions (polymorphing) × Number of instances of the template (parameterizing)

This problem is also addressed in B. Stroustrup, *The Design and Evolution of C++*, AT&T Bell Telephone Laboratories 1994. The Common Code Approach, where common components of the template classes are picked out and held in a separate basic class for the relevant concrete template class, is discussed as a possible solution. As a result of this process, a class is divided into two parts: in one part, which can be considered as an interface, is the typed template class and in the other part, which can be considered as an implementation, is the untyped common code.

The known methods for reducing the size of computer programs produced with the aid of object-oriented programming techniques do not provide a satisfactory reduction of the size of the computer program. In accordance with the known methods, at least the typed template classes, and generally also the associated untyped basic classes, have virtual functions, that is, even if the size of an instance shrinks, the existence of the virtual functions leads to linearly expanding computer programs.

Because of the large size of such computer programs, just for medium and even small problems, the electronic storage and the execution of these programs demands a large expenditure on the computer systems required. Thus, for example, large and expensive storage, both working memory and mass memory, and substantial computing power must be allocated. In addition, a large computer program necessitates both a long loading time and a long execution time for the computer program.

SUMMARY OF THE INVENTION

The invention therefore has for an object to provide a method for the reduction in size of computer programs which offers an effective reduction in the size of the computer program.

The object is achieved by the method and applications disclosed in the independent claims. Advantageous implementations of the invention are disclosed in the relevant dependent claims.

The invention is based on a method in which the common components of one or more template classes produced with an object-oriented programming technique are separated from the typed interface classes with parameterized templates, where the typed interface classes exhibit no virtual functions. In accordance with the method disclosed, the untyped implementation classes are arranged in a second polymorph class hierarchy and method calls to the interface classes are delegated to the implementation classes.

The invention is particularly applicable to the technical field of building class libraries for an object-oriented programming language. The invention advantageously achieves an effective and significant reduction of the size of computer programs and thus permits the storage and execution of computer programs with reduced demands on the hardware requirements of the computer system.

The object is achieved, in particular, by the method of the present invention as set forth above. The advantage here is that, by arranging the untyped implementation classes in a second polymorph class hierarchy the separation of the untyped implementation classes, which show virtual functions, from typed interface classes, which show template classes, a complete separation of template classes and virtual functions is achieved.

It is a further advantage that method calls to the typed interface classes are delegated to the implementation classes, since, in this way the majority of functions can be kept very concise but at the same time complete. By delegation is to be understood in this connection a redirection or bypassing of the method or function calls to the implementation classes. In this way it is possible with advantage to incorporate these functions as so-called in-line functions directly into the source code called up during the compiling process.

A further advantage is that, because of the separation in accordance with the invention of typed interface classes with template classes and untyped implementation classes with virtual functions, the use of template classes has almost no influence any longer on the size of the executable computer program, since they are now very similar to an untyped function call in their effect on the program size. This advantage gains in significance when the implementation classes are used in a shared library or a dynamic link library (DLL).

The computer program may comprise container classes. The use of abstract class hierarchies and template classes is especially widespread in the implementation of container classes and thus illustrates the full extent of the problem underlying this invention. The use of the method in accordance with the invention is advantageous, especially in employing container classes, in reducing the size of the computer program considerably and very effectively.

The computer program may be produced using class libraries. In this case it is advantageous that the reduction in size of the executable computer program is particularly impressive if a class library is relied upon in creating the computer program. It is further advantageous that it is only necessary to use the method in accordance with the invention on the classes of the library once, namely at the beginning, and subsequently all accesses to these library classes will profit from the advantages of the method in accordance with the invention in respect of reduction of the executable program.

The object-oriented programming technique may be C++, which has the construct of a virtual function. In C++ the polymorphing of the class hierarchy is realized by the virtual functions, with only the untyped implementation classes comprising virtual functions.

The disclosed embodiment is specified for C++. For this it is advantageous that C++ is currently well known and widespread. The invention can also be used to advantage with C++ and is hence usable for a large number of existing problems in the industry. Moreover, some of the technical expressions used above (such as "virtual functions" or "template classes"), though certainly valid for all object-oriented programming languages in respect of their lexical content, are borrowed from C++. However, this only serves for easier understanding of the concepts and, in particular, does not imply any limitation of the overall validity and applicability of the solution to the basic problem in accordance with the invention.

During compilation the delegating functions may be automatically translated into in-line functions in the computer program. By compiling is generally meant the conversion from source code representations, which are drawn up in a non-machine-oriented programming language, into target instructions in a machine-oriented program language. In this case it is advantageous that the majority of functions can be translated by the compiler directly as in-line functions in the machine-oriented computer program. In this way the setting up and management of jump instructions and jump addresses can with advantage be eliminated and both the storage and the processing of the executable program will take place at higher speed and/or require less expenditure in respect of the computer hardware.

The method may be applied to the creation of a class library for an object-oriented programming language, which may be stored on a data carrier.

Automatic delegation may be used for transferring method calls to a typed interface class to an untyped implementation class with virtual functions. This use is the decisive concept for the solution of the object forming the basis of this invention. With this application it is first possible to free the interface classes from the virtual functions and hence to achieve all the aforementioned advantages of the invention and its embodiments.

DESCRIPTION OF THE DRAWINGS

One embodiment of the invention is shown in the drawings and is described in detail below.

DESCRIPTION OF THE PREFERRED EMBODIMENT

Figure 1:
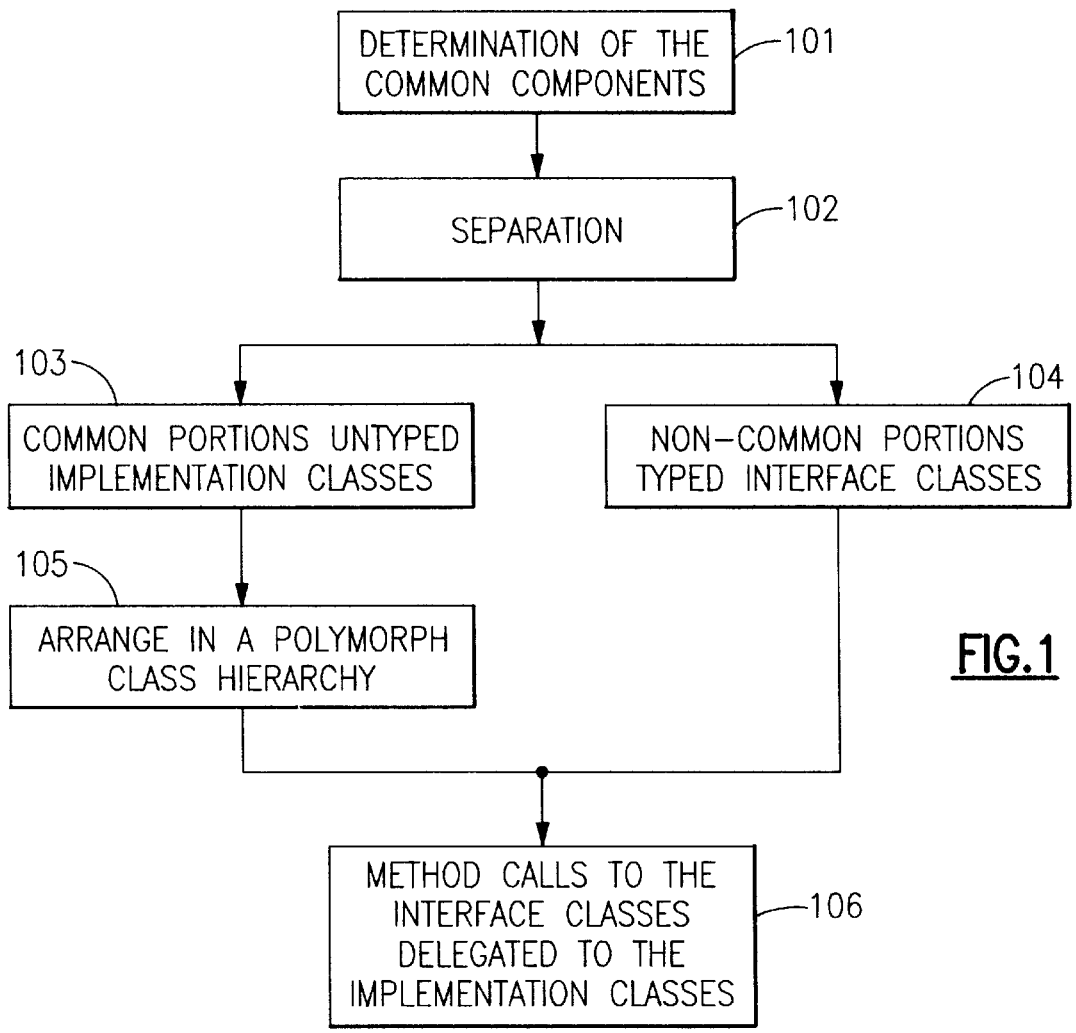
FIG. 1 shows a representation of the method in accordance with the invention in the form of a flow chart.

FIG. 1 shows a representation of the method in accordance with the invention in the form of a flow chart. In the first step of the method the common portions in the parameterized template classes are determined (101). There follows separation (102) of the common portions as untyped implementation classes (103) from the non-common portions as typed interface classes with parameterized templates (104), where the typed interface classes exhibit no virtual functions. In a further step in the method the untyped implementation classes are arranged in a polymorph class hierarchy (105). Finally, the method calls to the interface classes are delegated to the implementation classes (106).

Figure 2:
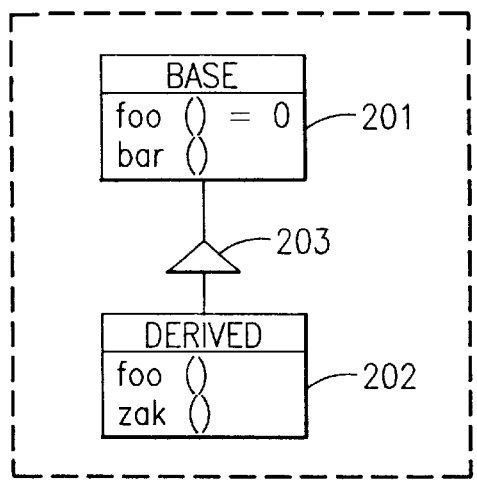
FIG. 2 shows a greatly simplified class hierarchy.

A highly simplified class hierarchy is shown in FIG. 2. The class Base 201 with the two functions foo and bar is in this example a base class, while the class Derived 202 with the two functions foo and zak represents a derived class. The polymorphic behaviour of an abstract class is achieved through virtual functions. In the present example of FIG. 2, for example, the function bar is declared as a virtual function since the class Base assumes that one of the classes derived from the class Base could carry out the different implementations of the function bar. In this case, one says that the class Derived inherits (203) the function bar from the class Base.

C++ the source code for FIG. 2 would be:

```
class Base {
public:
   virtual void foo ( ) = 0;
   virtual void bar ( ) { /* */ }
};
class Derived : public Base {
public:
   virtual void foo ( ) { /* */ }
   virtual void zak ( ) { /* */ }
};
```

If, on the other hand, all classes which are derived from the class Base were to be overwritten by an abstract function with its own specific implementation, this class is described as "pure virtual". In the above example, the function foo is such a purely virtual function.

FIG. 2 further shows that the class Derived only inherits the function bar from the class Base and, in particular, does not overwrite this virtual function, prepares its own implementation for the pure virtual function foo and, for its part, adds a further virtual function zak, which can be inherited or overwritten by the classes derived from the class Derived.

Every object, which has at least one virtual function, has a so-called pointer, which points to a table of virtual functions. This table of virtual functions contains the start addresses of all virtual functions, regardless of whether the virtual function was defined in the object class itself or in one of the base classes.

Figure 3:
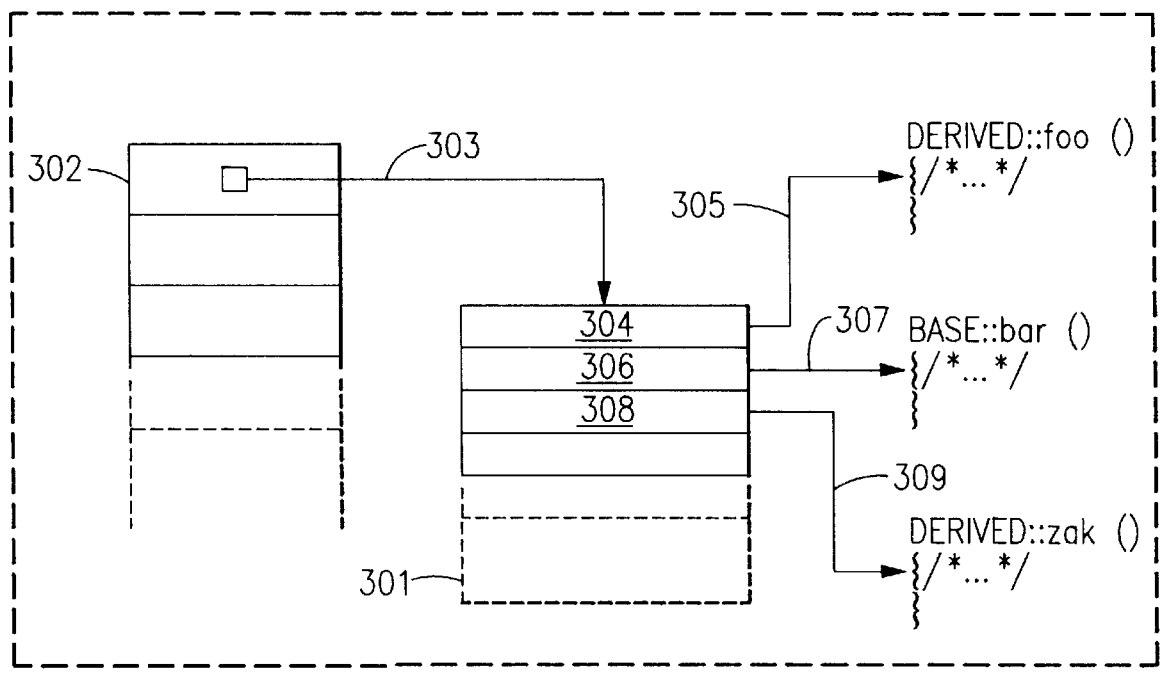
FIG. 3 shows a table of the virtual functions.

FIG. 3 shows such a table of virtual functions 301. The object 302 of the class Derived has a pointer 303 which points to the table of virtual functions 301 In the table of virtual functions 301 are the addresses of all virtual functions and hence the references to the starting addresses of these functions. In the present example the table of virtual functions 301 holds the address 304 with the reference 305 to the virtual function Derived::foo(), the address 306 with the reference 307 to the virtual function Base::bar() and the address 308 with the reference 309 to the virtual function Derived::zak().

A container class generally allows its element types and key types as formal parameters for later instances. In this way, for example, a set of STRINGs is separated from a set of INTEGERs. Since the relevant functions assume the instantiating argument or instantiating arguments, an INTEGER value cannot be added to a set of STRINGs or vice versa. Consequently, for each instance the programming code for an add function is duplicated. Together with the polymorphizing of the class hierarchy by virtual functions a growth thus takes place in the size of the computer program.

Figure 4:
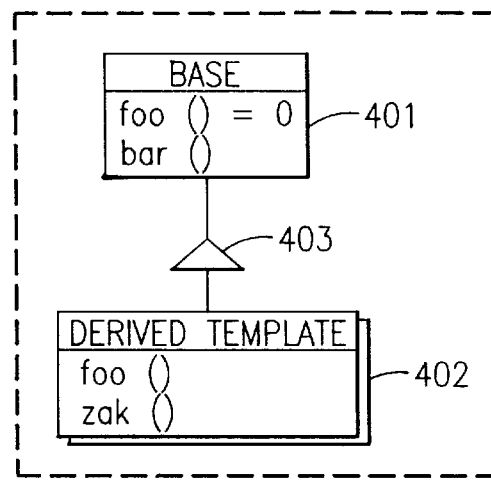
FIG. 4 shows a greatly simplified class hierarchy with a parameterized class.

Because of the virtual functions of the class Base, the template classes subsequently represented will be expressed with all their virtual functions, even and especially where the class DerivedTemplate is not used polymorphically. This is illustrated in FIG. 4. The class Base 401 inherits (403) to the template class DerivedTemplate 402 the "pure virtual" function foo as well as the virtual function bar. The template class DerivedTemplate 402 for its part adds on the virtual function zak. The corresponding C++ source code is represented as follows:

```
template <class AType>
class DerivedTemplate : public Base {
public :
   virtual void foo ( ) { /* */ }
   virtual void zak ( ) { /* */ }
};
```

This is brought about because the compiler has to enter the starting addresses of the virtual functions into the table of virtual functions.

Figure 5:
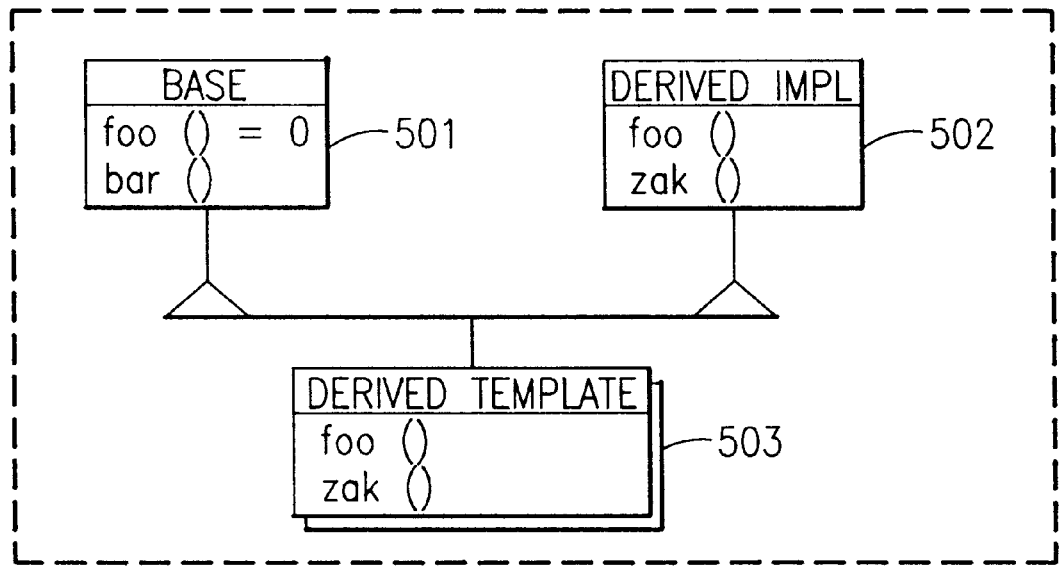
FIG. 5 shows the possibility of the Common Code Approach for reducing the size of the computer program.

FIG. 5 shows one possibility for reducing the size of the program namely taking out common parts of all instances of the template classes 503. This common part is untyped, for example of type void*; as well as the base class 501 it is held as a separate base class 502 for the concrete template class 503. In this way the template class 503 inherits the polymorph character of the original base class 501 and the implementation from the separate base class 502.

The following shows the corresponding C++ source code:

```
template <class AType>
class DerivedTemplate :    public Base,
                           public DerivedImpl {
public :
   virtual void foo ( ) { DerivedImpl::foo ( ) ; }
   virtual void zak ( ) { DerivedImpl::zak ( ) ; }
};
```

Figure 6:
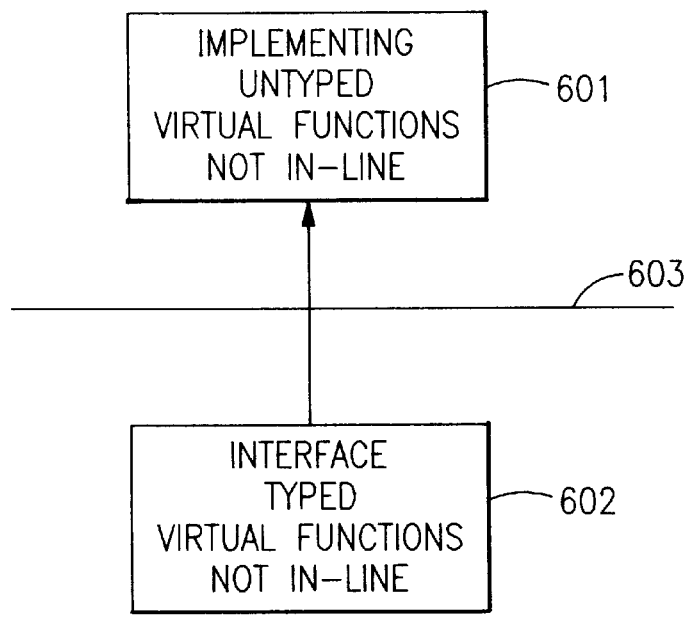
FIG. 6 shows the horizontal separation of interface classes and implementation classes.

This method is known as the Common Code Approach and can be considered as horizontal separation 603 of typed source code in interface class 602 and untyped source code in implementation class 601 and is represented diagrammatically in FIG. 6.

Figure 8:
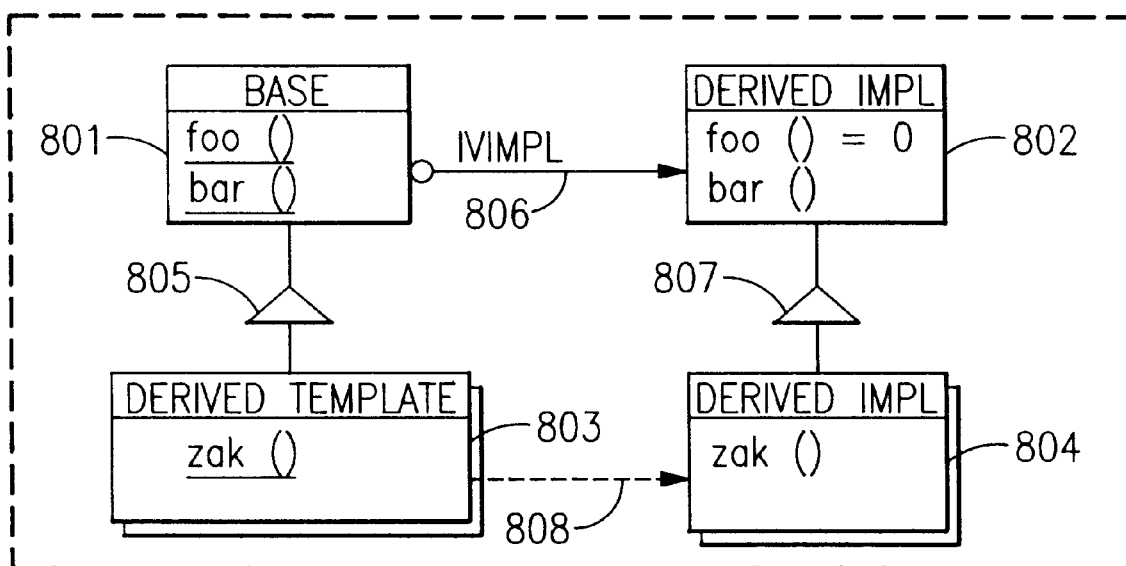
FIG. 8 shows the two parallel class hierarchies in accordance with the present invention.
Figure 7:
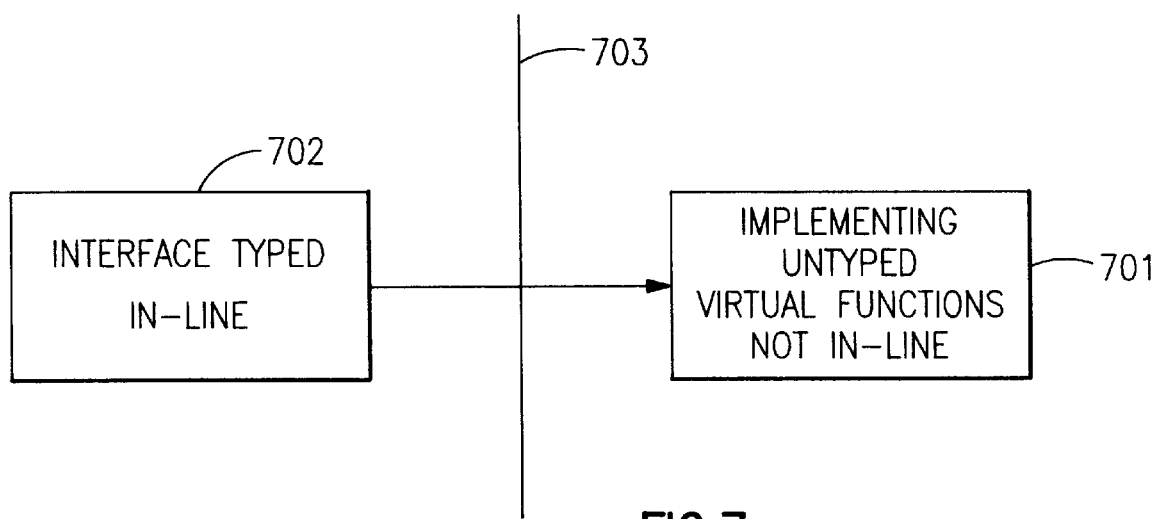
FIG. 7 shows the vertical separation in accordance with the invention of interface classes and implementation classes.

In contrast to the Common Code Approach the present invention achieves a vertical separation 703 of the interface classes and the implementation classes as shown in FIG. 7. Here the typed interface classes 702 are separated from the untyped implementation classes 701, where the typed interface classes no longer have any virtual functions. The properties "typed" and "virtual" are completely separated. Since the functions of the interface classes receive their functionality, in that they simply delegate the method call, these functions can be incorporated directly in the calling source code as in-line functions. The interface classes and the implementation classes typically show two parallel hierarchies. FIG. 8 shows how the class Base 801 inherits (805) functions to the template class DerivedTemplate 803, however, no longer polymorph but the functions foo ( ) and bar ( ) can now be incorporated in the computer program as in-line functions. The function or method calls to the class Base 801 are now delegated to the objects of class BaseImpl 802 in accordance with the information in the data field ivImpl 806 The class BaseImpl 802 inherits 807 the functions polymorphically, for example, the "pure virtual" function foo, to the class DeriveImpl 804, the objects of which are then instantiated 808 by the template class DerivedTemplate 803.

The following sample code shows an interface and its corresponding implementation, both in the form of a two-stage hierarchy:

```
class BaseImpl {
public :
    virtual BaseImpl ( ) { /* */ }
    virtual void foo ( ) = 0
    virtual void bar ( ) { /* */ }
};
class DerivedImpl :    public BaseImpl {
public
    virtual void foo ( ) { /* */ }
    virtual void zak ( ) ( /* */ }
};
class Base {
protected:
    BaseImpl* ivImpl;
public :
    Base (BaseImpl* impl) : ivImpl (impl) { /* */ }
    Base ( ) { delete ivImpl; }
    inline void foo ( ) { ivImpl -> foo ( ); }
    inline void bar ( ) { ivImpl -> bar ( ); }
};
template <class AType>
class DerivedTemplate : public Base {
public :
    DerivedTemplate ( ) : Base (new DerivedImpl)
{ /* */ }
    inline void zak ( ) { ((DerivedImpl*)ivImpl) ->
    zak ( ); }
};
```

The function, for example DerivedTemplate<AType>::zak( ) is only instantiated and incorporated in the program code when there is at least one call to this function. Since the class DerivedTemplate only delegates the call to the class DerivedImpl, the code size for the function DerivedTemplate<AType>::zak( ) is essentially equal to the code size for a non-template class.

Having thus described our invention, what we claim as new and desire to secure by Letters Patent is:

1. A method for reducing the size of a computer program produced by an object-oriented programming technique having classes and objects, and parameterized template classes, said method comprising the steps of:

determining common components in said parameterized template classes;

separating said common components as untyped implementation classes from the non-common components as typed interface classes with parameterized templates;

arranging said typed interface classes in a first class hierarchy wherein the typed interface classes exhibit no virtual functions;

arranging said untyped implementation classes in a second class hierarchy separate from said first class hierarchy; and automatically delegating method calls to said interface classes in said first class hierarchy to said implementation classes in said second class hierarchy.

2. The method of claim 1 wherein said computer program comprises container classes.

3. The method of claim 1 wherein said computer program is produced using class libraries.

4. The method of claim 1 wherein said object-oriented programming technique is an object-oriented programming language.

5. The method of claim 4 wherein said object-oriented programming language is C++.

6. The method of claim 4 wherein said object-oriented programming language has the construct of virtual functions.

7. The method of claim 6 wherein polymorphing of said class hierarchies is realized by said virtual functions.

8. The method of claim 6 wherein only said untyped implementation classes comprise said virtual functions.

9. The method of claim 1 wherein during compilation delegating functions are automatically translated into in-line functions in said computer program.

10. The application of the method of claim 1 to the creation of a class library for an object-oriented programming language.

11. The method of claim 1 in which said second class hierarchy is a polymorph class hierarchy.

12. A data carrier which stores a class library for an object-oriented programming technique, said class library being usable by a compiler to produce an object-code program executable on a computer, characterised in that the class library is produced by the method of claim 1.

13. A computer-implemented method in an object-oriented programming system, comprising the steps of:

determining common components of a plurality of classes;

separating said common components as untyped implementation classes from the non-common components as typed interface classes;

arranging said typed interface classes and said untyped implementation classes for providing automatically delegating method calls to said typed interface classes with no virtual functions in a first class hierarchy to said untyped implementation classes with virtual functions in a second class hierarchy separate from said first class hierarchy.

14. The method of claim 13 in which said second class hierarchy is a polymorph class hierarchy.

* * * * *